United States Patent
Jol et al.

(10) Patent No.: US 9,479,007 B1
(45) Date of Patent: Oct. 25, 2016

(54) INDUCTION CHARGING SYSTEM

(71) Applicant: Apple Inc., Cupertino, CA (US)

(72) Inventors: Eric S. Jol, Cupertino, CA (US); Ibuki Kamei, San Jose, CA (US); Warren Z. Jones, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/187,193

(22) Filed: Feb. 21, 2014

(51) Int. Cl.
*H02J 7/00* (2006.01)
*H01F 27/02* (2006.01)
*H02J 7/02* (2016.01)

(52) U.S. Cl.
CPC ............... *H02J 7/025* (2013.01); *H01F 27/02* (2013.01)

(58) Field of Classification Search
CPC ............................. H02J 7/0025; H01F 27/02
USPC ...................... 320/108; 336/94, 92
See application file for complete search history.

(56) References Cited

U.S. PATENT DOCUMENTS

| | | | |
|---|---|---|---|
| 2,798,895 A | 7/1957 | Nowotny | |
| 2,798,896 A | 7/1957 | Bly | |
| 4,152,825 A | 5/1979 | Bruneau | |
| 4,344,603 A * | 8/1982 | Hozumi | F16K 31/0606 137/625.65 |
| 4,455,026 A * | 6/1984 | Pinkus | F16J 15/43 277/301 |
| 5,238,222 A * | 8/1993 | Sumida | F02M 3/07 251/118 |
| 5,580,676 A | 12/1996 | Honda et al. | |
| 6,106,973 A | 8/2000 | Sonozaki et al. | |
| 6,174,164 B1 * | 1/2001 | Masjedi | A61C 17/00 433/215 |
| 6,358,644 B1 | 3/2002 | Shibata et al. | |
| 6,368,744 B1 | 4/2002 | Hatazawa et al. | |
| 6,528,204 B1 | 3/2003 | Hikmet et al. | |
| 6,549,756 B1 | 4/2003 | Engstrom | |
| 6,790,178 B1 | 9/2004 | Mault et al. | |
| 6,924,551 B2 | 8/2005 | Rumer et al. | |
| 7,103,407 B2 | 9/2006 | Hjelt et al. | |
| 7,270,910 B2 | 9/2007 | Yahnker et al. | |
| 7,288,340 B2 | 10/2007 | Iwamoto | |
| 7,356,923 B2 | 4/2008 | Honer | |
| 7,622,895 B1 | 11/2009 | Griffin | |
| 7,663,064 B2 | 2/2010 | Dutta et al. | |
| 7,714,542 B2 | 5/2010 | Lee et al. | |
| 7,887,948 B2 | 2/2011 | Jang et al. | |
| 7,910,243 B2 | 3/2011 | Koh et al. | |
| 7,948,208 B2 | 5/2011 | Partovi et al. | |
| 7,952,322 B2 | 5/2011 | Partovi et al. | |
| 7,972,721 B2 | 7/2011 | Kozu et al. | |
| 7,976,981 B2 | 7/2011 | Lee | |
| 8,031,122 B2 | 10/2011 | Jang et al. | |

(Continued)

FOREIGN PATENT DOCUMENTS

| | | |
|---|---|---|
| CN | 101702412 | 5/2010 |
| EP | 0792741 | 2/1986 |

(Continued)

OTHER PUBLICATIONS

EPO Examination Report, for European Patent Application No. 12777976.7, mailed on Jun. 28, 2016.

*Primary Examiner* — Phallaka Kik
(74) *Attorney, Agent, or Firm* — Kilpatrick Townsend & Stockton LLP (57) ABSTRACT

An inductive charging system and method is disclosed. A ferrofluid layer is disposed between the charging coil and the receiving coil. The ferrofluid layer directs and focuses the magnetic flux field flowing between the charging coil and the receiving coil.

20 Claims, 8 Drawing Sheets

(56) References Cited

U.S. PATENT DOCUMENTS

| | | | |
|---|---|---|---|
| 8,034,477 B2 | 10/2011 | Yamada | |
| 8,119,278 B2 | 2/2012 | Bailey et al. | |
| 8,124,269 B2 | 2/2012 | Takahashi et al. | |
| 8,169,185 B2 | 5/2012 | Partovi et al. | |
| 8,241,786 B2 | 8/2012 | Taniguchi et al. | |
| 8,259,013 B2 | 9/2012 | Jang et al. | |
| 8,260,371 B2 | 9/2012 | Kawata et al. | |
| 8,293,402 B2 | 10/2012 | Lee | |
| 8,345,420 B2 | 1/2013 | McClure et al. | |
| 8,427,825 B2 | 4/2013 | Szczypinski | |
| 8,445,125 B2 | 5/2013 | Baek et al. | |
| 8,518,569 B2 | 8/2013 | Murphy et al. | |
| 8,526,998 B2 | 9/2013 | Koide et al. | |
| 8,558,509 B2 | 10/2013 | He et al. | |
| 8,603,670 B2 | 12/2013 | Taniguchi et al. | |
| 8,629,652 B2 | 1/2014 | Partovi et al. | |
| 8,629,654 B2 | 1/2014 | Partovi et al. | |
| 8,679,674 B2 | 3/2014 | Liang et al. | |
| 8,778,529 B2 | 7/2014 | Seo | |
| 8,890,470 B2 | 11/2014 | Partovi | |
| 8,896,264 B2 | 11/2014 | Partovi | |
| 8,901,881 B2 | 12/2014 | Partovi | |
| 8,947,047 B2 | 2/2015 | Partovi et al. | |
| 8,999,566 B2 | 4/2015 | Chung et al. | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,178,369 B2 | 11/2015 | Partovi | |
| 9,301,034 B2* | 3/2016 | Kantor | H04R 9/025 |
| 2002/0094475 A1 | 7/2002 | Aoyama | |
| 2003/0129483 A1 | 7/2003 | Gross | |
| 2005/0142439 A1 | 6/2005 | Lee et al. | |
| 2007/0154794 A1 | 7/2007 | Kim et al. | |
| 2007/0260136 A1* | 11/2007 | Hunter | A61N 1/40 600/407 |
| 2007/0264535 A1 | 11/2007 | Lee et al. | |
| 2008/0001573 A1 | 1/2008 | Carey | |
| 2008/0075319 A1* | 3/2008 | Kantor | H04R 9/025 381/420 |
| 2008/0286644 A1 | 11/2008 | Yeo | |
| 2009/0246620 A1 | 10/2009 | Lee et al. | |
| 2009/0317708 A1 | 12/2009 | Brandl et al. | |
| 2010/0052603 A1 | 3/2010 | Bourilkov et al. | |
| 2010/0081049 A1 | 4/2010 | Holl et al. | |
| 2010/0316911 A1 | 12/2010 | Tesson et al. | |
| 2011/0014954 A1 | 1/2011 | Dossas et al. | |
| 2011/0043309 A1* | 2/2011 | Wamala | H01F 7/066 335/260 |
| 2011/0050164 A1 | 3/2011 | Partovi et al. | |
| 2011/0175569 A1 | 7/2011 | Austin | |
| 2011/0215480 A1 | 9/2011 | Gorczyca et al. | |
| 2011/0221385 A1 | 9/2011 | Partovi et al. | |
| 2011/0223447 A1 | 9/2011 | Ignor et al. | |
| 2011/0236727 A1 | 9/2011 | Jang | |
| 2011/0287318 A1 | 11/2011 | Loveness et al. | |
| 2012/0116176 A1 | 5/2012 | Moravec et al. | |
| 2012/0121944 A1 | 5/2012 | Yamamoto et al. | |
| 2012/0305605 A1* | 12/2012 | Vassaux | B67D 1/0005 134/93 |
| 2013/0034763 A1 | 2/2013 | Byun | |
| 2013/0053110 A1 | 2/2013 | Pope et al. | |
| 2013/0071696 A1 | 3/2013 | Kim et al. | |
| 2013/0093388 A1 | 4/2013 | Partovi | |
| 2013/0099563 A1 | 4/2013 | Partovi et al. | |
| 2013/0171490 A1 | 7/2013 | Rothkopf et al. | |
| 2013/0249479 A1 | 9/2013 | Partovi | |
| 2013/0260677 A1 | 10/2013 | Partovi | |
| 2013/0271069 A1 | 10/2013 | Partovi | |
| 2013/0285604 A1 | 10/2013 | Partovi | |
| 2013/0285605 A1 | 10/2013 | Partovi | |
| 2013/0300204 A1 | 11/2013 | Partovi | |
| 2013/0323055 A1* | 12/2013 | Eden | F03D 7/0224 416/1 |
| 2014/0050948 A1 | 2/2014 | Hashimoto et al. | |
| 2014/0065474 A1 | 3/2014 | Werner et al. | |
| 2014/0103873 A1 | 4/2014 | Partovi et al. | |
| 2014/0132210 A1 | 5/2014 | Partovi | |
| 2014/0147703 A1 | 5/2014 | Werner et al. | |
| 2014/0147730 A1 | 5/2014 | Werner | |
| 2014/0191568 A1 | 7/2014 | Partovi | |
| 2014/0306654 A1 | 10/2014 | Partovi | |
| 2015/0043156 A1 | 2/2015 | Jain et al. | |
| 2015/0130412 A1 | 5/2015 | Partovi | |
| 2015/0145475 A1 | 5/2015 | Partovi et al. | |
| 2015/0185055 A1 | 7/2015 | King | |
| 2015/0220109 A1 | 8/2015 | von Badinski et al. | |
| 2015/0255776 A1 | 9/2015 | Dabov | |
| 2015/0256007 A1 | 9/2015 | Zadesky et al. | |
| 2016/0064780 A1 | 3/2016 | Jarvis et al. | |
| 2016/0080614 A1* | 3/2016 | Hollinger | H04N 5/2252 348/144 |

FOREIGN PATENT DOCUMENTS

| | | |
|---|---|---|
| EP | 1931010 | 6/2008 |
| EP | 2540221 | 1/2013 |
| EP | 2653053 | 10/2013 |
| JP | 61032951 | 2/1986 |
| JP | 63314770 | 12/1988 |
| JP | 10012200 | 1/1998 |
| JP | 2000058018 | 2/2000 |
| JP | 2001118547 | 4/2001 |
| JP | 2001250515 | 9/2001 |
| JP | 2001250516 | 9/2001 |
| JP | 2001332752 | 11/2001 |
| JP | 2005108750 | 4/2005 |
| JP | 2005129260 | 5/2005 |
| JP | 2005268138 | 9/2005 |
| JP | 2007048725 | 2/2007 |
| JP | 2007165200 | 6/2007 |
| JP | 2010021074 | 1/2010 |
| KR | 20010007769 | 2/2005 |
| KR | 20090075396 | 7/2009 |
| WO | WO00/41252 | 7/2000 |
| WO | WO2008/023199 | 2/2008 |
| WO | WO2011/000239 | 1/2011 |
| WO | WO2011/095758 | 8/2011 |

\* cited by examiner

FIG. 1

PRIOR ART

INDUCTION CHARGING SYSTEM

TECHNICAL FIELD

Embodiments described herein relate generally to battery charging systems. More particularly, the present embodiments relate to an induction charging system. In still greater particularity, the present embodiments relate to improved induction charging systems which provide for improved performance and increased tolerance for misalignment of the charging coils.

BACKGROUND

Recent advances in portable computing have resulted in increased convenience for users of portable electronic devices. For example, mobile telephone, smart phones, computer tablets, and laptop computers allow a user to communicate while that user is mobile. That is, a user has the ability to travel freely while employing these electronic devices for communication and internet access including for navigational purposes.

In addition to portable electronic devices, many other devices use battery power. For example, battery powered automobiles and golf carts are in widespread use. Lawn mowers and other rechargeable devices such as electric toothbrushes utilize rechargeable battery power. With initiatives to reduce carbon emissions, the trend toward use of battery power may accelerate into the future.

The portable electronic devices referred to above operate on battery power which is what allows them to be mobile. That is, no power cords or other paraphernalia which might interfere with, or restrict, user movement are required. However, the user is limited by the capabilities of the battery such as power life etc. In particular, battery life may be a significant concern to a user in that it will limit the amount of time available for his or her mobility. Batteries require frequent recharging in order to maintain their power capabilities.

However, battery recharging presents challenges of its own. That is, battery chargers themselves require power cords to tether the device to the charger. Power cords gather dust and become tangled. In some cases they can be dangerous. For example, when power cords for chargers are used around water, a dangerous shock situation may develop. In addition, loose plugs or bent prongs may result in a less than successful charging cycle. Repeated use may result in wire breakage adjacent to the plug. Thus the use of electric chargers, while suited for their intended purpose, may be limited in their usefulness and convenience.

One alternative technology that is being adopted is inductive charging using wireless chargers. Wireless transmission uses a magnetic field to transfer electricity allowing compatible devices to receive power through this induced current rather than using conductive wires and cords. Inductive charging is a method by which a magnetic field transfers electricity from an external charger to a mobile device such as a phone or laptop computer without the use of standard wiring.

Inductive charging uses a charging station to send energy through an inductive coupling to an electrical device, which can then use that energy to charge batteries or run the device. Induction chargers typically use an induction coil to create an alternating electromagnetic field and create a current in the receiving device from within a charging base station. A second induction coil in the portable device takes power from the electromagnetic field and converts it back into electrical current to charge the battery. The two induction coils in proximity combine to form an electrical transformer.

The advantages of inductive charging include protected connections in that no corrosion occurs when the electronics are all enclosed and away from water or oxygen in the atmosphere. In the case of batteries used in medical implants or other embedded medical devices, inductive charging allows recharging/powering through the skin rather than having wires penetrate the skin, which would increase the risk of infection. Another advantage to inductive charging increases durability. Without the need to constantly plug and unplug the device, there is significantly less wear and tear on the socket of the device and the attaching cable.

However, there are some disadvantages to conventional inductive charging. The main disadvantages of inductive charging are its lower efficiency and increased resistive heating in comparison to direct contact charging. Inductive charging implementations using lower frequencies or older technologies may charge more slowly and generate heat within many portable electronic devices. Because of the lower efficiency, devices can take longer to charge when supplied power is equal. Inductive charging also requires drive electronics and coils in both device and charger, increasing the complexity and cost of manufacturing and therefor the cost to the user.

One additional cause for the above disadvantages and limitations of inductive charging is poor alignment of the charging coils which can cause energy losses and reduce the efficiency of the entire system. Poor efficiency reduces the charging speed of the system and requires more input power. Poor coupling can also lead to thermal issues as discussed above. Conventional solutions to the problem of misalignment of coils include increasing the number of coils into an array of coils or by including some type of coil alignment system in the inductive charging apparatus to allow the user to improve the performance of the system. Electromechanical, mechanical, or other visual alignment systems may be utilized for improved coil alignment in induction charging systems.

Inductive charging stations typically have a flat surface, often referred to as the interface surface, on top of which a user can place one or more mobile devices. As discussed above, in order for an efficient power transfer to happen, the transmitting or transceiver coil which is part of the base station must be aligned with the receiving coil, which is part of the mobile device. Two methods have been used for aligning the transmitting coil and the receiving coil in the mobile device. The first alignment method uses guided positioning where a user places the mobile device on a certain location on the base station's surface. For this purpose, the mobile device provides an alignment aid that is appropriate to its size, shape and function. This requires user effort and careful placement of the mobile device on the base station surface and limits the base station to charging mobile devices of a certain configuration.

The second alignment method allows free positioning and does not require the user to place the mobile device in direct alignment with the transmitting coil in the base station. In order to allow free positioning, a bundle of transmitting coils is included in the base station to generate a magnetic field over a larger area. This method may require the use of more energy to power additional coils. Another method to achieve free positioning provides mechanical means to move a single transmitting coil in the base station underneath the receiving coil in the mobile device. This method introduces additional mechanical complexity to the base station and requires user effort to align the coils. In effect, this method is the counterpart to the guided positioning of the mobile device.

SUMMARY

A system for improving the performance of an inductive charging system is disclosed which includes adding a ferrofluid between the transceiver and receiver coils of an inductive charging system. A ferrofluid located between the transceiver and receiver coils of an induction charging system reduces the cross coupling of magnetic fields of the system significantly.

A ferrofluid consists of ferromagnetic particles that are suspended in a liquid allowing the ferromagnetic particles to move freely in the liquid. When the magnetic transceiver and receiver coils are placed adjacent to the ferrofluid, the ferromagnetic particles will move preferentially to the areas with the highest magnetic flux. The ferrofluid thus provides a bridge between the transceiver and receiver coils which focuses and channels the magnetic flux between the coils. This creates a preferential path for the magnetic flux to travel between the two coils and reduces the losses to the rest of the system.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a ferrofluid placed between transceiver and receiver coils in an inductive charging system. This and other embodiments are discussed below with reference to FIGS. 1-9. However, those skilled in the art will readily appreciate that the detailed description given herein with respect to these figures is for explanatory purposes only and should not be construed as limiting. Further, the figures are intended as representative, and are not intended to require any particular size, shape, dimensions, or the like for any embodiment.

Figure 1:
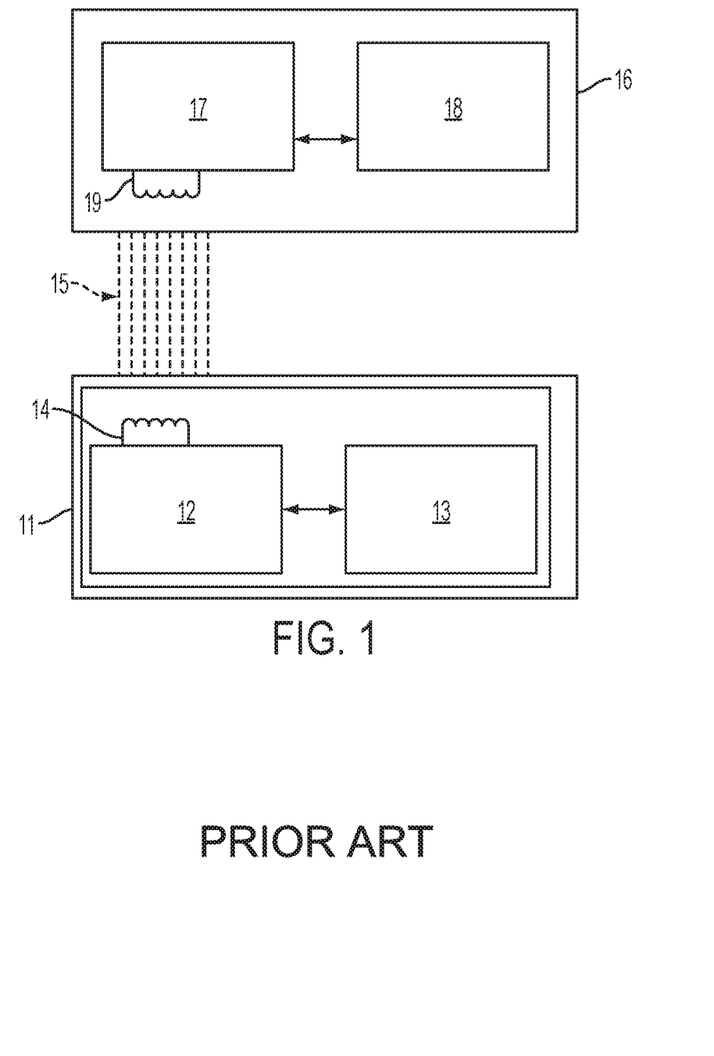
FIG. 1 is a schematic diagram illustrating a conventional inductive charging system.

FIG. 1 is a schematic diagram illustrating a conventional inductive charging system configuration. As shown, a charging unit 11 includes power unit 12 and control circuitry 13. A transmitting (primary) coil 14 generates the magnetic field 15. A mobile device includes a battery pack 16 which includes a battery 18 and associated control circuitry 17. A receiving coil 19 captures the magnetic field 15 from the charging unit 11. Receiving coil 19 has an electrical current induced therein when the receiving coil 19 is positioned adjacent to the transmitting coil 14 and the battery charging unit 11 is energized. Charging unit 11 may be energized by alternating current (AC) or direct current (DC).

Primary coil 14, when energized, has A/C current running through it which will create magnetic flux 15 that allows receiving coil 19 to inductively couple with primary coil 14, thereby producing a voltage at the receiving coil when receiving coil is in the vicinity of primary coil 14. Voltage received in secondary coil 19 will induce current therein which may be provided to charge battery 17 after being rectified in control circuitry 17. As discussed above, it may be useful for primary coil 14 and receiving coil 19 to be sufficiently close to enable primary coil 14 to induce the electrical current in pick up coil 19 through magnetic flux 15, which extends between the coils.

Figure 2:
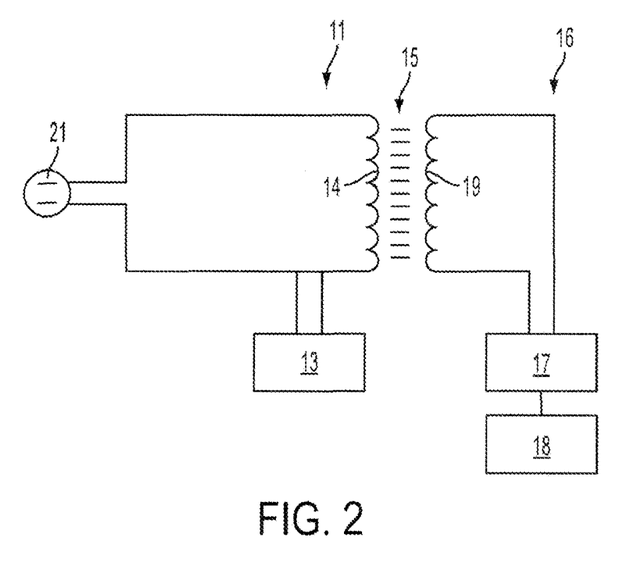
FIG. 2 is a schematic of the circuitry associated with the inductive charging system.

Referring to FIG. 2, a schematic of the circuitry associated with the inductive charging system is shown. Charging unit 11 includes power input 21 which may be a conventional AC plug or a DC input. Charger unit 11 includes control circuitry 13 which may be a switching power supply to boost voltage and/or frequency of AC on the charger coil 14. Coil 14 when energized, has AC current running through it which will create magnetic flux lines 15 that will allow another coil in the vicinity to receive voltage, such as through induction in secondary coil 19, and provide a current therein. Secondary coil 19 is generally sized and/or shaped according to the voltage required to be transferred, with charging coil 14 having voltage and frequency sufficient to allow secondary coil 19 to be as small as possible and permit it to fit inside battery pack 16. The current induced in secondary coil 19 may be rectified by control circuitry 17 and provided to battery 18.

Figure 3:
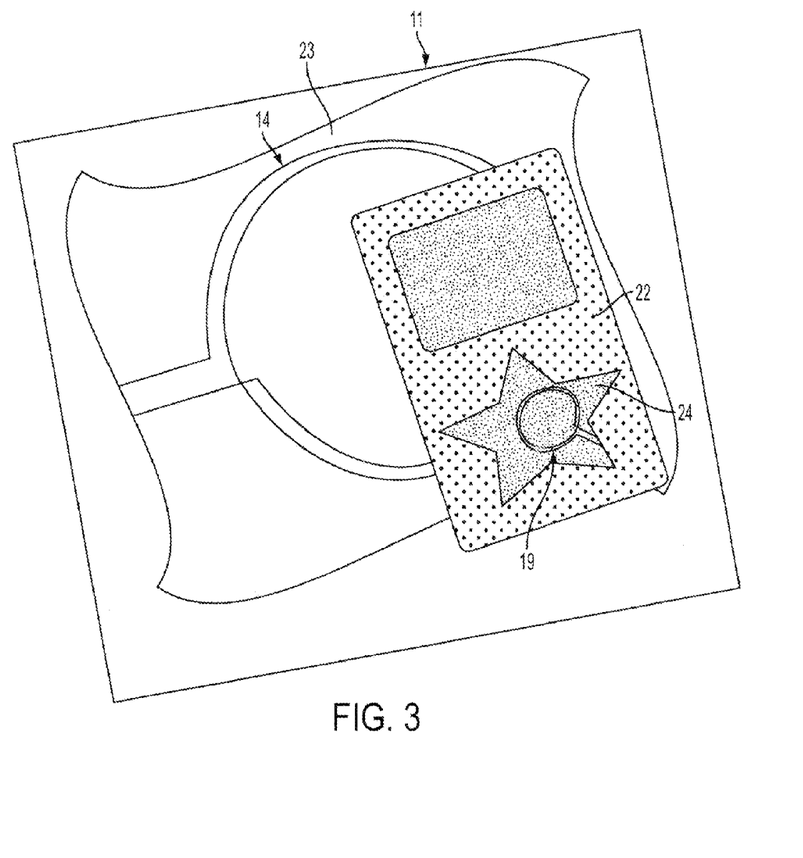
FIG. 3 is a perspective view of a mobile device on the surface of an inductive charging unit.

Referring to FIG. 3, a mobile device 22 is shown on the surface of charging unit 11. A portion 23 of charging unit 11 is shown in cutaway to reveal a schematic of charging coil 14 and a portion 24 of mobile device 22 is shown in cutaway to reveal a schematic of receiving coil 19. It should be appreciated that either or both of charging coil 14 and charging coil 19 may be different sized and/or shaped in varying embodiments. Further, the mobile device 22 may be any of a number of mobile devices, such as: a portable media player (as shown); a smart phone; a tablet computing device; a laptop or desktop computer; a personal digital assistant; a wearable device; an electronic device having display projection functionality; headphones; an input/output device; a personal assistant; a health monitoring device; and so on.

As discussed above, the inductive charging process occurs when charging coil 14 and receiving coil 19 are in close proximity. Alignment of coils 14 and 19 occurs when mobile device 22 and charging unit 11 are properly aligned with respect with one another. The alignment of mobile device 22 and charging unit 11 such that coils 14 and 19 are placed in close proximity may be accomplished by various mechanical means such as visual indicia or other suitable methods. However, in the event that coils 14 and 19 are not properly positioned, the magnetic flux 15 between the coils (and shown in FIG. 1) may not be optimized, thereby leading to weak and/or inefficient inductive charging of the mobile device 22. Indeed, if the misalignment is too great, then no charging at all may take place.

It should be appreciated that the relative size, shape and positioning of the coils 14, 19 may vary between embodiments. For example, the charging unit 11 may have an array or pattern of a number of different charging/transmit coils 14. The pattern of charging coils 14 may be sized and/or shaped such that they are approximately the same size (although not necessarily the same number of windings) as the receive coil 19, in certain embodiments. Alternatively, the transmit 14 and receive 19 coils may be of different sizes (as illustrated), shapes, and so on. Likewise, the charging unit 11 and/or device 22 (which, in some embodiments, need not be a mobile device) may be of different sizes and/or shapes than shown. accordingly, FIG. 3 is intended to convey general concepts as opposed to specific spatial relationships and/or embodiments.

A ferrofluid is a liquid which becomes magnetized in the presence of a magnetic field. Ferrofluids are colloidal liquids made of nanoscale ferromagnetic, or ferromagnetic particles of magnetite, hematite or some other compound containing iron. The particles are suspended in a carrier fluid, usually an organic solvent or water. Each tiny particle is thoroughly coated with a surfactant to inhibit clumping. The particles are small enough for both thermal agitation to disperse them evenly within a carrier fluid, and for them to contribute to the overall magnetic response of the fluid. The ferromagnetic particles may move freely in the suspension liquid.

Figure 4:
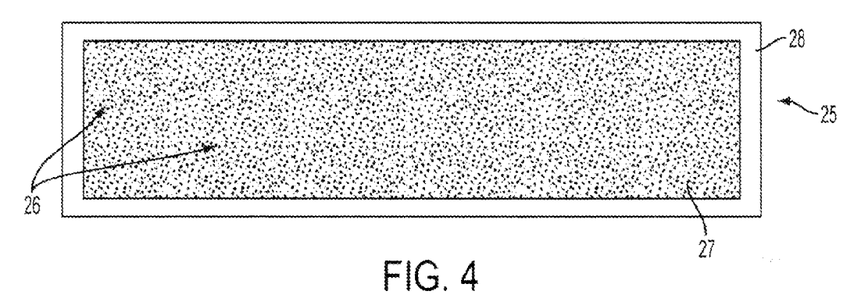
FIG. 4 is a side sectional view of a ferrofluid layer according to one embodiment.

Referring to FIG. 4, in one embodiment, ferrofluid layer 25 is shown in side sectional view. Ferromagnetic particles 26 are shown suspended in a liquid 27 such as water which is contained in an enclosure 28 made from silicone, polymer, plastic or other suitable packaging material. Enclosure 28 may be a flexible or rigid container, and may (in some embodiments) be partitioned into multiple sub-enclosures. Such sub-enclosures may be connected to one another or may be entirely separate from one another, or a combination thereof.

While water or organic solvent may be used as the carrier fluid 27, it should be expressly understood that other materials such as silicone gel may be used with departing from the disclosed embodiments. When magnetic fields are placed close to the ferrofluid, at least some ferromagnetic particles 26 will move preferentially to the areas with highest magnetic flux.

Figure 5:
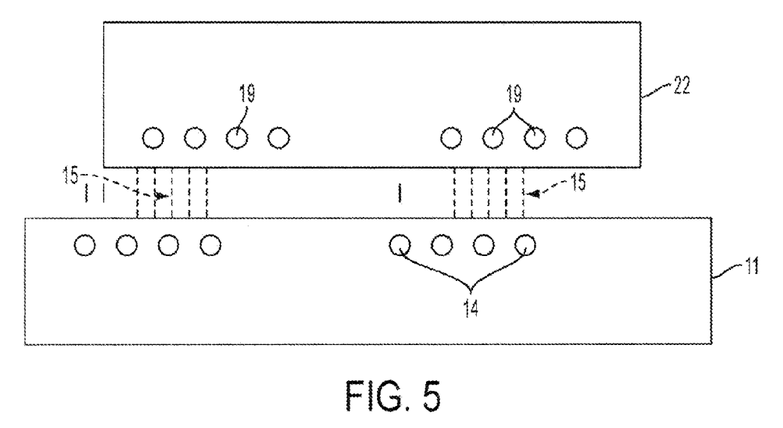
FIG. 5 is a side sectional view of a mobile device on a conventional charging unit.

Referring to FIG. 5, a limited schematic side sectional view of the mobile device 22 and charging unit 11 is shown, particularly showing the location and orientation of the charging coils 14, 19. It should be appreciated that either or both of the mobile device 22 and charging unit 11 may include additional components, circuitry, shielding, displays, and the like, none of which are shown for purposes of clarity.

In this embodiment, mobile device 22 and charging unit 11 are oriented as discussed above with respect to FIG. 3. However, the orientation of mobile device on charging unit 11 is not precise such that the orientation of coils 14 and 19 is not optimized. Thus, magnetic flux lines 15 do not induce current into coils 19 in the most efficient manner. Poor alignment causes losses and reduces efficiency and thus reducing charging speed, and requires more power to charge the device 22 to the same level, as discussed above. In addition, thermal issues can arise due to poor coupling of coils 14 and 19. For example, voltage may be transformed into waste heat in the device 22 or the charging unit 11 rather than inductively coupling therebetween.

Figure 6:
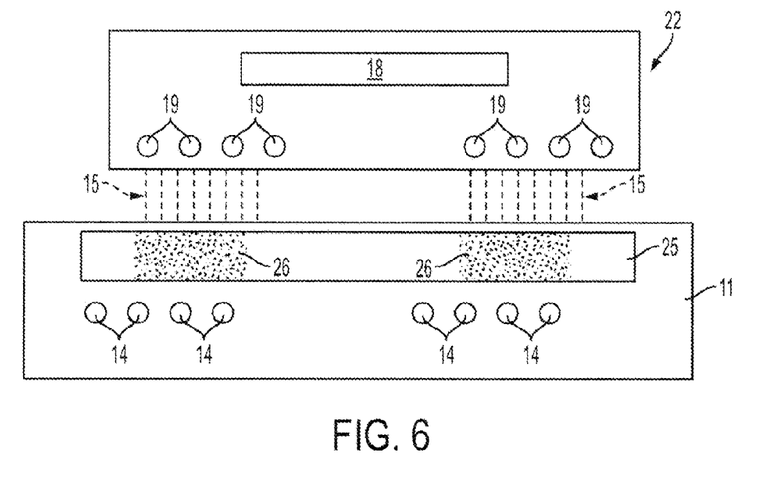
FIG. 6 is a side sectional view of one embodiment illustrating a ferrofluid layer in a charging unit.

Referring to FIG. 6, in one embodiment, a ferrofluid layer 25 is positioned in charging unit 11 so as to be located between coils 14 and 19. By having ferrofluid layer 27 between transceiver coils 14 and receiver coils 19 of an induction system, the tolerance to misalignment can be reduced significantly. The ferrofluid may be attracted by the magnetic flux 15 to a position between the transmit and receive coils 14, 19, thereby creating a directed flux path between the coils and directing the flux 15 between the coils such that little or less flux dissipates than would occur without the ferrofluid 26. The ferrofluid may thus change is location, position, and/or distribution as compared to a rest state of the ferrofluid (e.g., when no magnetic flux is generated by either or both coils). The ferrofluid 26 may be attracted to the region of magnetic flux and shaped by the magnetic flux.

In other words, in this embodiment, the concentration of ferromagnetic particles 26 in ferrofluid layer 25 may create a bridge between the two coils 14 and 19 which creates a preferential path for the magnetic flux 15 to travel in, focusing the flux 15 between the coils 14 and 19 and reducing or eliminating the losses due to the misalignment of the coils 14 and 19. The increased efficiency in the electromagnetic energy transfer from coil 14 to coil 19 improves the function of charger 11, may reduce a charging time for the mobile device 22, and is more forgiving to a user who may not properly place mobile device 22 on charger 11.

Although the ferromagnetic particles 26 are shown as being separated into two distinct regions, it should be appreciated that the actual distribution of the ferrofluid and constituent ferromagnetic particles may vary with a number of different factors, including, but not limited to: strength of the magnetic flux 15; size and shape of the chamber of the ferrofluid layer 25 (including whether or not sub-chambers are in or form the chamber); physical characteristics of the ferrofluid itself; distance between the transmit and receive coils; and so on. In some embodiments, for example, the ferrofluid and/or ferromagnetic particles may form a peak, pillar, bridge or other structure at the regions of magnetic flux 15 while a reservoir of ferrofluid and/or ferromagnetic particles is distributed along a base of the chamber of the ferrofluid layer.

Figure 7:
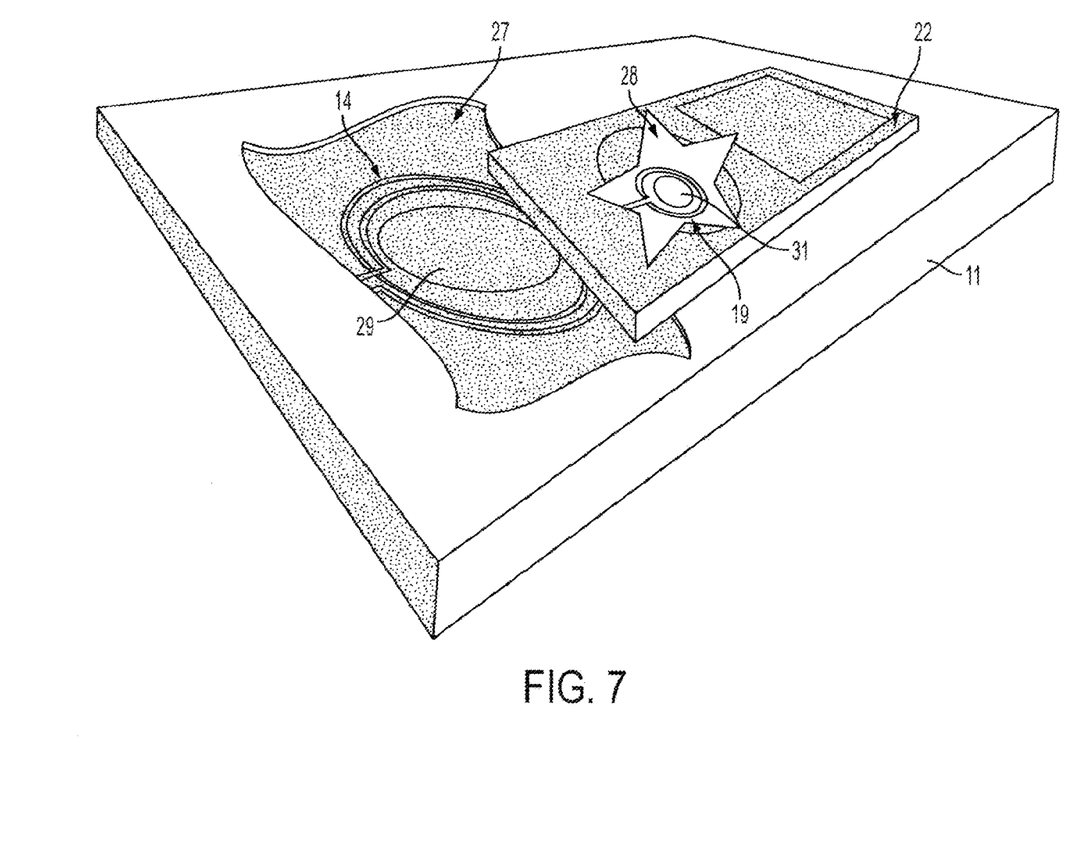
FIG. 7 is a partial cutaway view of mobile device on the surface of charging unit.

Referring to FIG. 7, mobile device 22 is shown on the surface of charging unit 11. A portion 27 of charging unit 11 is shown cutaway to reveal charging coil 14 and a portion 28 of mobile device 22 is shown cutaway to reveal receiving coil 19. As was discussed above, the inductive charging process occurs when charging coil 14 and receiving coil 19 are in close proximity. Alignment of coils 14 and 19 occurs when mobile device 22 and charging unit 11 are properly aligned with respect with one another. In one embodiment, in order to assist in the alignment of coils 14 and 19 by the proper positioning of mobile device 22 with respect to charging unit 11, magnetic portions 29 and 31 are provided adjacent to coils 14 and 19. The positive and negative magnetic fields generated by magnetic portions 29 and 31 may be used for alignment of coils 14 and 19. That is, magnetic portion 29 could be oriented so as to generate a positive magnetic field which will attract portion 31 having a negative magnetic field orientation. Alternately, magnetic portion 29 could be negative and portion 31 could be positive. By aligning coils 14 and 19 through magnetic portions 29 and 31, maximum charging efficiency can be obtained.

Figure 8:
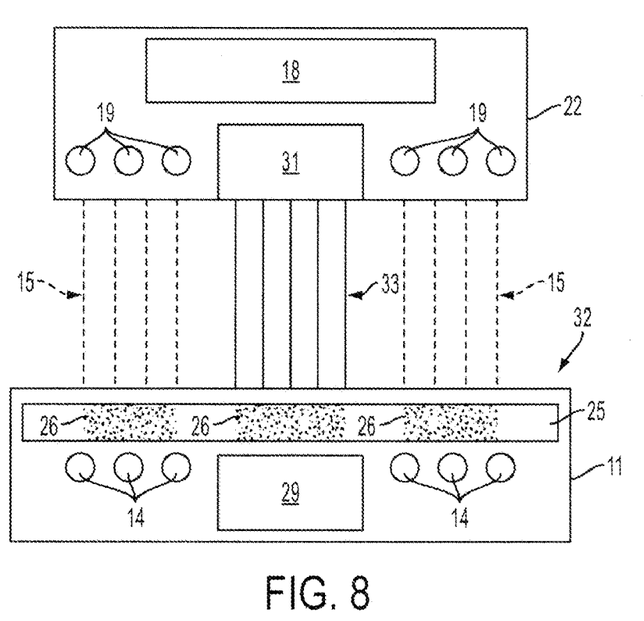
FIG. 8 is a side sectional view of one embodiment including a ferrofluid layer between a charging coil and a receiving coil.

As discussed above with respect to FIG. 7, magnetic portions 29 and 31 are included in the charging and mobile device to aid in alignment of coils 14 and 19. However, as can be appreciated, a magnetic field generated by these portions 29 and 31 may interfere with the magnetic flux lines 15 generated between coils 14 and 19. Referring to FIG. 8, a side sectional view of one embodiment is shown. In this embodiment a ferrofluid layer 25 is provided between charging coil 14 and receiving coil 19. Ferrofluid layer 25 directs flux lines 15 generated between coils 14 and 19. In one embodiment, ferrofluid layer 25 is provided adjacent the top interface surface 32 of charging unit 11. In another embodiment, ferrofluid layer 25 may be positioned in mobile device 22. In either embodiment, ferrofluid layer 27 is positioned between coils 14 and 19 and between magnets 29 and 31. FIG. 7 shows charging unit 11 and mobile device 22 separated so as to illustrate flux lines 15 and 33. As can be appreciated, when charging, mobile device 22 is in contact with top surface 32 such that coils 14 and 19 are in closer proximity than is illustrated in FIG. 7.

Referring to FIG. 7, magnetic flux lines 33 are generated by magnetic portions 29 and 31 that serve to align mobile device 22 on charging station 11. That is, while the attraction between magnetic portions 29 and 31 due to the magnetic flux lines field 33 serve to align coils 14 and 19 to improve the charging efficiency, those same flux lines 33 may interfere with magnetic flux lines 15 which operate to recharge battery portion 18 in mobile device 22. The DC field due to magnetic flux lines 33 can saturate the AC field generated by flux lines 15 as the DC field is stronger. Ferrofluid layer 25 directs and intensifies both flux lines 15 and 33 and thud reduces or eliminates the cross talk or coupling of the AC flux field 15 and DC flux field 29. The ferromagnetic particles 26 move in liquid 27 to align in magnetic fields 15 and 33 to serve as a conduit or bridge that directs both flux lines 15 and 33 and reduces the cross talk or interference between flux field 15 and flux field 33.

Coupling of the DC field 33 with AC field 15 causes the DC field to saturate the AC field. Such saturation can cause heat and inefficiency in the charging process. By having ferrofluid layer 25 between the transceiver coil 14 and the receiver coil 19 in the inductive charging system, the tolerance to misalignment of charging coil 14 and receiver coil 19 is significantly increased. As discussed above, the ferromagnetic particles in ferrofluid layer 27 may move freely. Thus when magnetic systems are placed close to ferromagnetic layer 27, those ferromagnetic particles will move preferentially to the areas with the highest magnetic flux. This will create a bridge between the magnetic coils thereby creating a preferential path for the lines of flux and focusing the flux between the coils and reducing the losses to the rest of the system. In one embodiment, the addition of ferrofluid layer 25 focuses both magnetic flux field 15 and magnetic flux field 19 and largely separates them such that there is no crosstalk or saturation of one field and the other.

Figure 9:
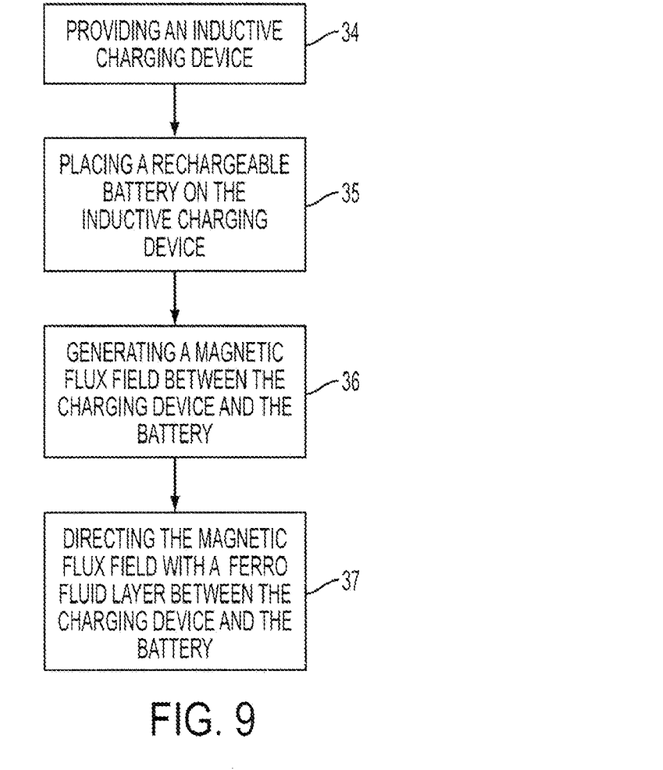
FIG. 9 is a flow chart illustrating a method for charging a battery according to one embodiment.

Referring to FIG. 9, a flow chart illustrating the steps for charging a battery is shown. In step 34, an inductive charging device is provided. The inductive charging device includes a ferrofluid layer positioned adjacent the transceiver coil in the inductive charging device. In step 35, a rechargeable battery which may or may not be in a portable electronic device, is placed on the inductive charging device. The rechargeable battery is positioned such that a receiving coil adjacent the battery is positioned in proximity to a transceiver or transmitting coil in the charging device. The charging device is energized in step 36 such that an electromagnetic field is generated between the coils in the charging device and the rechargeable battery. The coils in the charging device and the rechargeable battery generate magnetic flux which is directed by a bridge through ferrofluid layer in step 37. As discussed above, the bridge intensifies and directs magnetic flux between the coils in the rechargeable battery and the inductive charging device such that the requirement for precise positioning is reduced. Heat loss and longer charging cycles due to inefficiencies which may be caused by poor alignment of the rechargeable battery on the inductive charging device are reduced or eliminated. In another embodiment, coupling between the charging magnetic field produced by charging coils and a magnetic field produced by magnetic alignment devices is reduced or eliminated.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. For example, while transceiver coil 14 and receiver coil 19 have been described as in a generally circular shape, it should be expressly understood that embodiments disclosed herein may be employed with coils of other geometric shapes. It will be apparent to one of ordinary skill in the art that many modifications and variations are possible in view of the above teachings.

What is claimed is:

1. An inductive charging device comprising:
   a housing defining an upper surface;
   an electromagnetic transceiver coil in the housing; and
   a ferrofluid layer in the housing between the coil and the upper surface,
   and operative to shape an electromagnetic field between the transceiver coil and a receiving coil abutting the upper surface.

2. The inductive charging device of claim 1 wherein said ferrofluid layer includes ferromagnetic particles suspended in one of water, an organic solvent or silicone gel.

3. The inductive charging device of claim 1 wherein said ferrofluid layer is contained in a rigid enclosure.

4. The inductive charging device of claim 1 wherein said ferrofluid layer is contained in a segmented enclosure.

5. The inductive charging device of claim 1, wherein said ferrofluid changes location when a magnetic field is created by said electromagnetic housing.

6. The inductive charging device of claim 5, wherein said ferrofluid layer is operative to direct said magnetic field in a path other than a default path of the field assumed in the absence of the ferrofluid.

7. An inductive charging system comprising:
   an electronic device including:
      a rechargeable battery;
      a receiving coil electromagnetically associated with said battery;
   an inductive charging device including:
      a housing having an upper surface;
      a transceiver coil in said housing;
      a ferrofluid layer positioned between said transceiver coil and said receiving coil; and
      whereby said ferrofluid layer directs an electromagnetic field between said receiving coil and said transceiver coil when said electronic device is positioned adjacent said upper surface.

8. The inductive charging system of claim 7 wherein said ferrofluid layer is located in said charging device between said transceiver coil and said upper surface.

9. The inductive charging system of claim 7 wherein said ferrofluid layer is located in said electronic device such that said ferrofluid layer is positioned between said receiving coil and said transceiver coil when said electronic device is positioned adjacent said upper surface.

10. The inductive charging system of claim 7 further including:
 a first magnet located in said electronic device adjacent to said receiving coil; and
 a second magnet located in said inductive charging device adjacent to said transceiver coil.

11. The inductive charging system of claim 7 wherein said ferrofluid layer includes ferromagnetic particles in a suspension.

12. The inductive charging system of claim 7, wherein:
 said ferrofluid layer is contained within an enclosure; and
 said ferrofluid layer moves within said enclosure when a magnetic field is generated by said transceiver coil.

13. The inductive charging system of claim 7, wherein said ferrofluid layer enhances a voltage inductively transmitted by said transceiver coil to said receiving coil.

14. The inductive charging system of claim 13, wherein said ferrofluid layer defines at least a portion of a path of magnetic flux between said transceiver coil and said receiving coil.

15. The inductive charging system of claim 14, wherein said ferrofluid layer reduces a charging time for said inductive charging device.

16. A method for charging an electronic device comprising the steps of:
 providing an inductive charging device;
 placing an rechargeable battery on the inductive charging device;
 generating a magnetic flux field between the charging device and the rechargeable battery; and
 directing said magnetic flux field with a ferrofluid layer positioned between the charging device and the rechargeable battery.

17. The method of claim 16 wherein said rechargeable battery is contained in an electronic device.

18. The method of claim 17 wherein said ferrofluid layer is located adjacent said rechargeable battery in said electronic device.

19. The method of claim 16 wherein said ferrofluid layer is located in said inductive charging device.

20. The method of claim 16 wherein said ferrofluid layer includes ferromagnetic particles in water.

* * * * *